US011985364B2

(12) United States Patent
Chen

(10) Patent No.: US 11,985,364 B2
(45) Date of Patent: May 14, 2024

(54) VIDEO EDITING METHOD, TERMINAL AND READABLE STORAGE MEDIUM

(71) Applicant: GUANGDONG OPPO MOBILE TELECOMMUNICATIONS CORP., LTD., Guangdong (CN)

(72) Inventor: Jiayu Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 113 days.

(21) Appl. No.: 17/841,641

(22) Filed: Jun. 15, 2022

(65) Prior Publication Data

US 2022/0312048 A1 Sep. 29, 2022

Related U.S. Application Data

(63) Continuation of application No. PCT/CN2020/133047, filed on Dec. 1, 2020.

(30) Foreign Application Priority Data

Dec. 17, 2019 (CN) .......................... 201911298854.1

(51) Int. Cl.
*H04N 21/23* (2011.01)
*G11B 27/031* (2006.01)
(Continued)

(52) U.S. Cl.
CPC ......... *H04N 21/234* (2013.01); *G11B 27/031* (2013.01); *H04N 21/44* (2013.01); *H04N 21/47205* (2013.01)

(58) Field of Classification Search
USPC ........................................................ 386/281
See application file for complete search history.

(56) References Cited

U.S. PATENT DOCUMENTS 7,512,886 B1 * 3/2009 Herberger ............ G11B 27/034
715/723
7,801,413 B2 * 9/2010 Terakado ................ G11B 27/11
715/208

(Continued)

FOREIGN PATENT DOCUMENTS

CN 107393569 11/2017
CN 107483843 12/2017

(Continued)

OTHER PUBLICATIONS

CNIPA, Notification to Grant Patent Right for Invention for CN Application No. 201911298854.1, Nov. 4, 2022.

(Continued)

*Primary Examiner* — Nigar Chowdhury
(74) *Attorney, Agent, or Firm* — Hodgson Russ LLP

(57) ABSTRACT

A video editing method, a terminal and a non-transitory computer-readable storage medium are provided. The video editing method includes: marking one or more video clips in an original video; determining a first video clip from the one or more video clips, based on a time interval between two adjacent rhythm points in a predetermined music segment; and editing the first video clip to obtain a second video clip, where a starting time and an ending time of the second video clip correspond to the two rhythm points.

20 Claims, 10 Drawing Sheets

(51) Int. Cl.
*H04N 21/234* (2011.01)
*H04N 21/44* (2011.01)
*H04N 21/472* (2011.01)

(56) References Cited

U.S. PATENT DOCUMENTS

| | | | |
|---|---|---|---|
| 10,381,041 B2* | 8/2019 | Dittmer-Roche | G11B 27/031 |
| 10,509,966 B1* | 12/2019 | Noel | G06V 20/46 |
| 10,692,537 B2* | 6/2020 | Eppolito | H04N 21/47205 |
| 10,726,594 B2* | 7/2020 | Eppolito | G06V 20/30 |
| 10,726,872 B1* | 7/2020 | Boyd | G11B 27/031 |
| 10,734,026 B2* | 8/2020 | Fisher | G11B 27/11 |
| 10,798,145 B1* | 10/2020 | Garney | H04N 21/2407 |
| 10,915,566 B2* | 2/2021 | Marino | H04N 21/8456 |
| 10,984,248 B2* | 4/2021 | Shimauchi | G11B 20/10 |
| 11,024,288 B2* | 6/2021 | McCallum | G10L 15/16 |
| 2003/0160944 A1* | 8/2003 | Foote | G11B 27/034 |
| 2005/0025454 A1 | 2/2005 | Nakamura et al. | |
| 2006/0193387 A1* | 8/2006 | Wu | G06F 16/739 348/700 |
| 2008/0119733 A1* | 5/2008 | Zhang | A61B 8/465 600/443 |
| 2008/0269613 A1* | 10/2008 | Summers | A61B 8/483 600/459 |
| 2009/0024039 A1* | 1/2009 | Wang | A61B 10/0233 600/459 |
| 2015/0228310 A1 | 8/2015 | Lothian et al. | |
| 2016/0127708 A1* | 5/2016 | Freudenberger | G11B 27/34 386/338 |
| 2016/0307142 A1* | 10/2016 | Prabhakara | G06V 20/52 |
| 2017/0303001 A1* | 10/2017 | Montoya | G11B 27/34 |
| 2018/0167698 A1* | 6/2018 | Mercer | G11B 27/031 |
| 2018/0190325 A1* | 7/2018 | Hayashi | G11B 27/34 |
| 2018/0295427 A1* | 10/2018 | Leiberman | H04N 21/8456 |
| 2018/0373939 A1* | 12/2018 | Diggins | G06F 16/785 |
| 2019/0373170 A1* | 12/2019 | Fujita | H04N 23/651 |
| 2023/0362472 A1* | 11/2023 | Wakamatsu | H04N 23/695 |

FOREIGN PATENT DOCUMENTS

| | | |
|---|---|---|
| CN | 109168084 | 1/2019 |
| CN | 109257545 | 1/2019 |
| CN | 110519638 | 11/2019 |

OTHER PUBLICATIONS

EPO, Extended European Search Report for EP Application No. 20903904.9, Dec. 6, 2022.
WIPO, International Search Report and Written Opinion for PCT/CN2020/133047, Feb. 25, 2021.
CNIPA, First Office Action for CN Application No. 201911298854.1, Dec. 31, 2020.
CNIPA, Second Office Action for CN Application No. 201911298854.1, Sep. 2, 2021.
CNIPA, Third Office Action for CN Application No. 201911298854.1, Mar. 17, 2022.

* cited by examiner

VIDEO EDITING METHOD, TERMINAL AND READABLE STORAGE MEDIUM

CROSS-REFERENCE TO RELATED APPLICATION (S)

The present application is a continuation of International Patent Application No. PCT/CN2020/133047, filed Dec. 1, 2020, which claims priority to Chinese Patent Application No. 201911298854.1, filed Dec. 17, 2019, the entire disclosures of which are incorporated herein by reference.

TECHNICAL FIELD

The disclosure relates to the technical field of consumer electronic technologies, and particularly to a video editing method, a terminal and a non-transitory readable storage medium.

BACKGROUND

At present, during editing a video, a user usually clips some video clips from multiple videos, and then these video clips are spliced together and then integrated with an appropriate background music to form a new edited video.

SUMMARY

Embodiments of the disclosure provide a video editing method, a terminal and a non-transitory readable storage medium.

The video editing method provided by an embodiment of the disclosure includes operations as follows. At least one video clip is marked in an original video. A first video clip is determined from the at least one video clip, based on a time interval between two adjacent rhythm points in a predetermined music segment, where a duration of the first video clip is greater than or equal to the time interval. The first video clip is edited to obtain a second video clip, where a starting time and an ending time of the second video clip correspond to the two rhythm points.

The terminal provided by an embodiment of the disclosure includes a processor, and the processor is configured to implement operations as follows. At least one video clip is marked in an original video. For every two adjacent rhythm points in a predetermined music segment, a first video clip is determined from the at least one video clips, based on a time interval between the two adjacent rhythm points, where a duration of the first video clip is greater than or equal to the time interval. The first video clip is edited to obtain a second video clip, where a starting time and an ending time of the second video clip correspond to the two rhythm points.

The non-transitory computer-readable medium provided by an embodiment of the disclosure is stored with computer-executable instructions. The computer-executable instructions are configured to, when executed by one or more processors, cause the one or more processors to perform a video editing method including operations as follows. At least one video clip is marked in an original video. One of the at least one video clip, which has a duration greater than or equal to a time interval between two adjacent rhythm point in a predetermined music segment and is with a smallest one of all time difference(s) corresponding to the at least one video clip, is determined as the first video clip. Each of the all time difference(s) is a difference between the duration of each of the at least one video clip and the time interval The first video clip is edited to obtain a second video clip, where a starting time and an ending time of the second video clip correspond to the two rhythm points.

Additional aspects and advantages of the disclosure will be given in part in the following description, and become apparent in part from the following descriptions, or be learned from the practice of embodiments of the disclosure.

BRIEF DESCRIPTION OF THE DRAWINGS

In order to more clearly illustrate technical solutions in embodiments of the disclosure or in the related art, drawings used in the description of the embodiments or the related art will be briefly described below. Apparently, the drawings in the following description are merely some embodiments of the disclosure. For those skilled in the art, other drawings may also be obtained based on these drawings without paying any creative work.

DETAILED DESCRIPTION OF PREFERRED EMBODIMENTS

Embodiments of the disclosure will be described in detail below. Same or similar references indicate, throughout the drawings, same or similar elements or elements having same or similar functions. In addition, the embodiments described with reference to the drawings are exemplary and only used for explaining the disclosure, and should not be construed as limitations to the disclosure.

Figure 1:
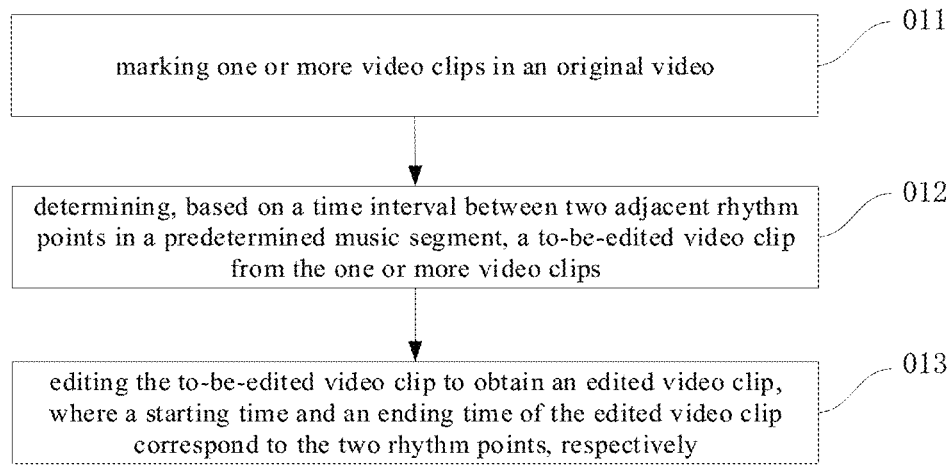
FIG. 1 is a schematic flowchart illustrating a video editing method according to some embodiments of the disclosure.

Referring to FIG. 1, the video editing method provided by an embodiment of the disclosure may include:

marking one or more video clips in an original video;

determining, based on a time interval between two adjacent rhythm points in a predetermined music segment, a to-be-edited video clip (also referred to as a first video clip) from the one or more video clips, where a duration of the to-be-edited video clip is greater than or equal to the time interval; and editing the to-be-edited video clip to obtain an edited video clip (also referred to as a second video clip), where a starting time and an ending time of the edited video clip correspond to the two rhythm points, respectively.

Figure 5:
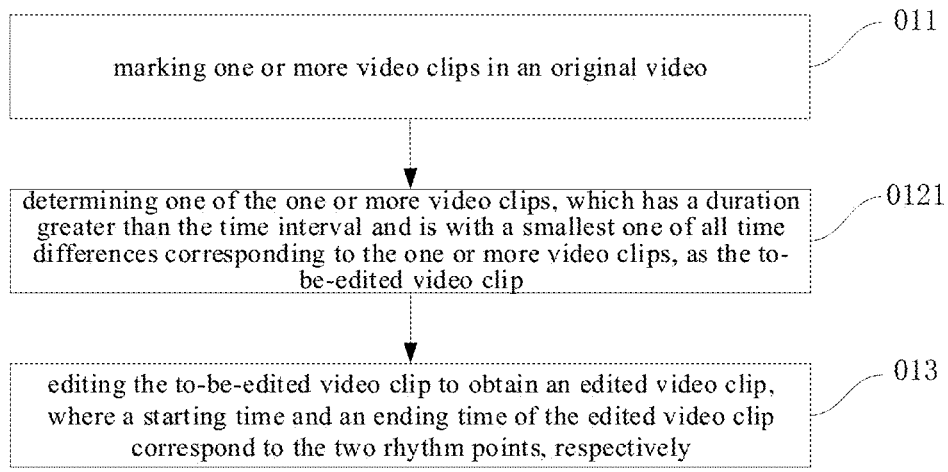
FIG. 5 is a schematic flowchart illustrating a video editing method according to some embodiments of the disclosure.

Referring to FIG. 5, in some embodiments, the operation of determining, based on a time interval between two adjacent rhythm points in a predetermined music segment, a to-be-edited video clip from the one or more video clips, may include:

determining one of the one or more video clips, which has a duration greater than the time interval and is with a smallest one of all time differences corresponding to the one or more video clips, as the to-be-edited video clip, where each of the all time differences is a difference between the duration of each of the one or more video clips and the time interval.

Figure 7:
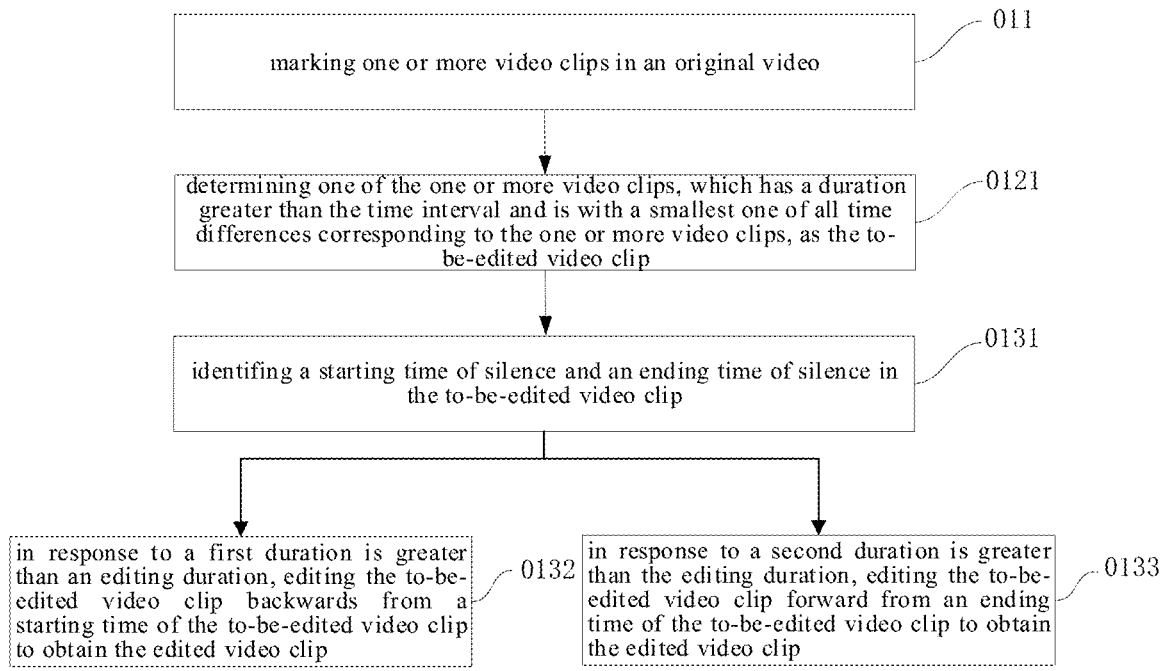
FIG. 7 is a schematic flowchart illustrating a video editing method according to some embodiments of the disclosure.

Referring to FIG. 7, in some embodiments, the operation of editing the to-be-edited video clip to obtain an edited video clip, may include:

identifying a starting time of silence and an ending time of silence in the to-be-edited video clip; in response to a first duration is greater than an editing duration, editing the to-be-edited video clip backwards from a starting time of the to-be-edited video clip to obtain the edited video clip, where the first duration is a silence duration corresponding to the starting time of the to-be-edited video clip, and the editing duration is equal to a duration of a part of the to-be-edited video clip exceeding the time interval; in response to a second duration is greater than the editing duration, editing the to-be-edited video clip forward from an ending time of the to-be-edited video clip to obtain the edited video clip, where the second duration is a silence duration corresponding to the ending time of the to-be-edited video clip.

Figure 10:
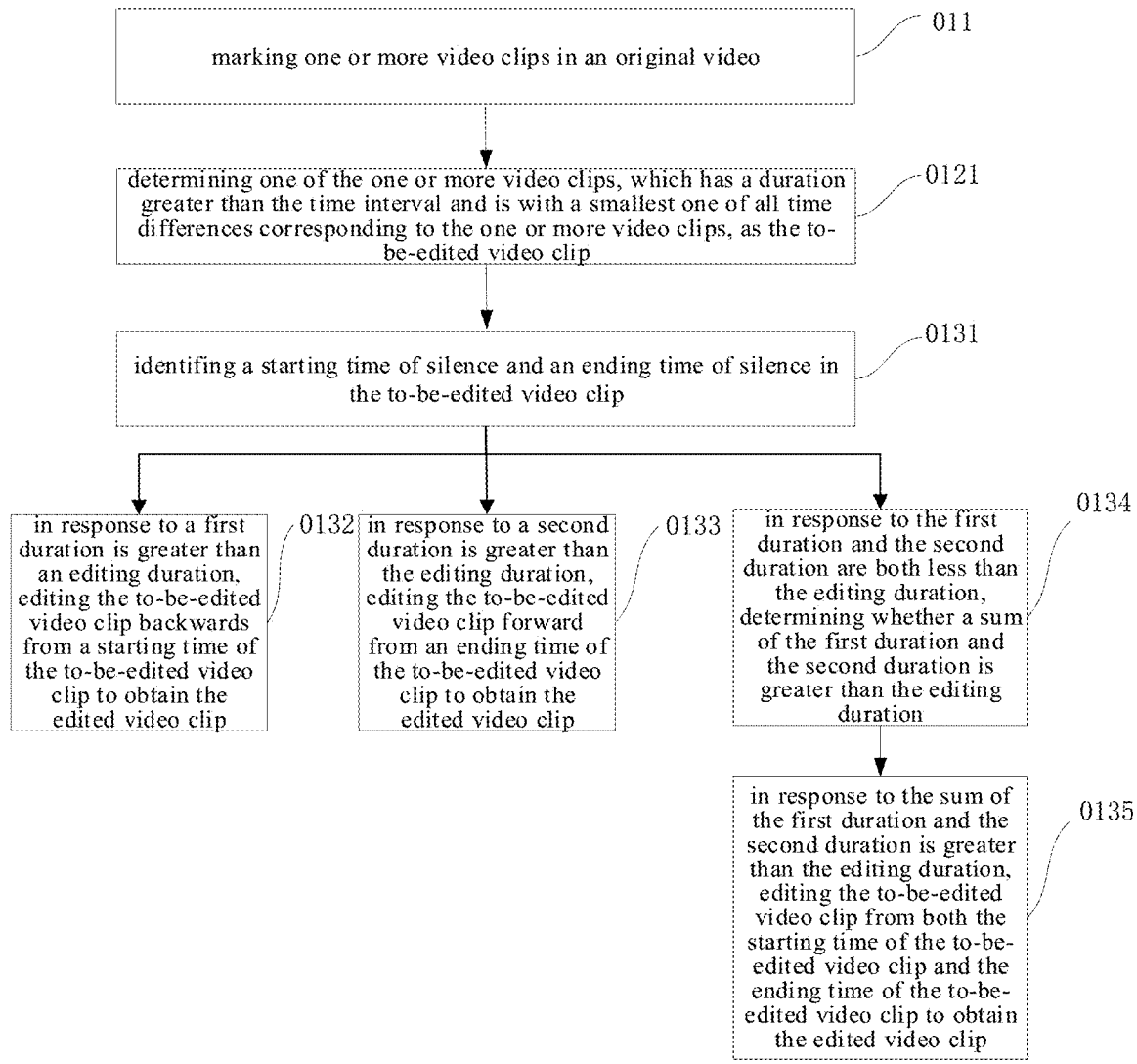
FIG. 10 is a schematic flowchart illustrating a video editing method according to some embodiments of the disclosure.

Referring to FIG. 10, in some embodiments, the operation of editing the to-be-edited video clip to obtain an edited video clip, may include:

in response to the first duration and the second duration are both less than the editing duration, determining whether a sum of the first duration and the second duration is greater than the editing duration; and in response to the sum of the first duration and the second duration is greater than the editing duration, editing the to-be-edited video clip from both the starting time of the to-be-edited video clip and the ending time of the to-be-edited video clip to obtain the edited video clip.

Figure 12:
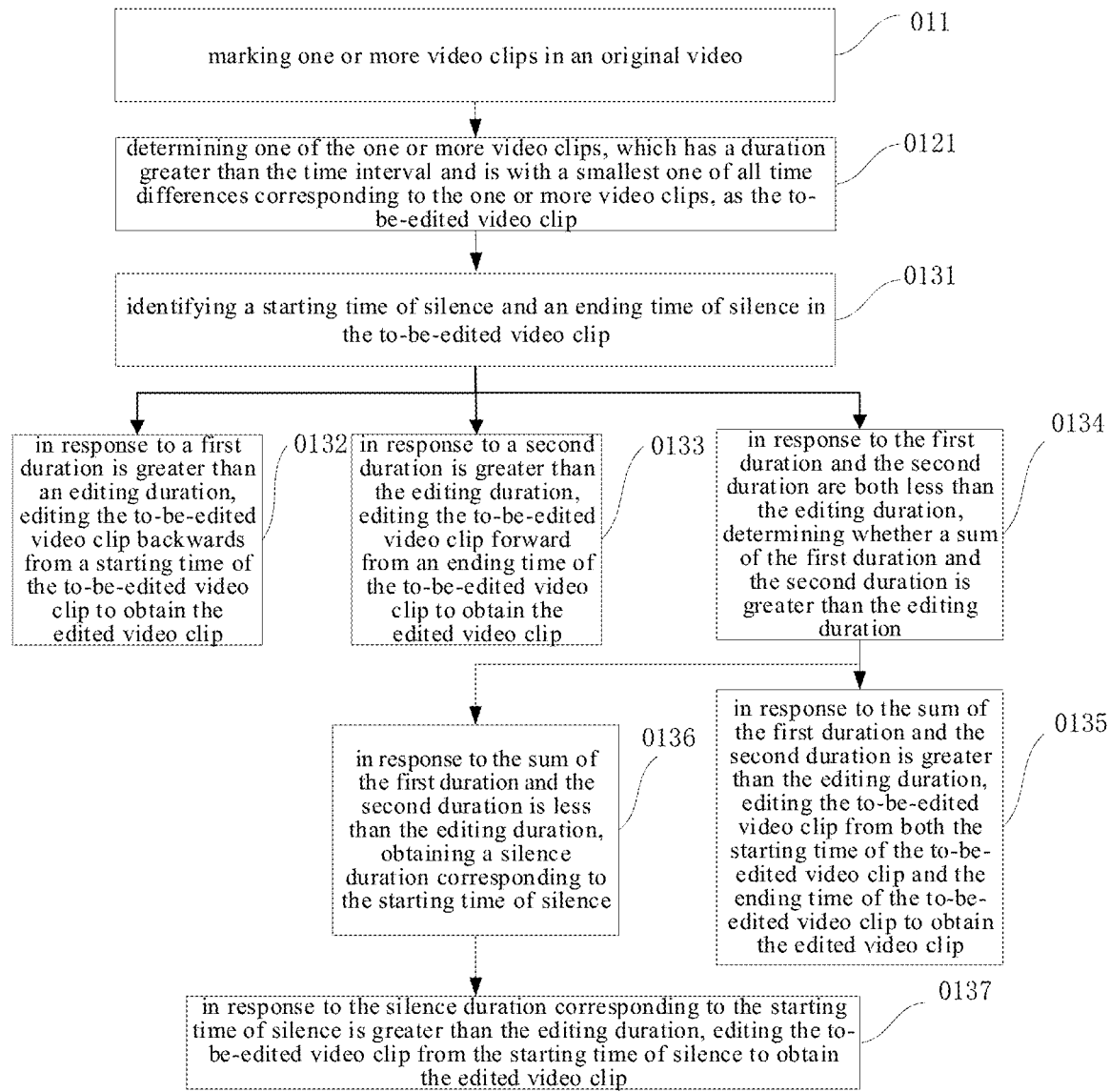
FIG. 12 is a schematic flowchart illustrating a video editing method according to some embodiments of the disclosure.

Referring to FIG. 12, in some embodiments, the operation of editing the to-be-edited video clip to obtain an edited video clip, may include:

in response to the sum of the first duration and the second duration is less than the editing duration, obtaining a silence duration corresponding to the starting time of silence; and in response to the silence duration corresponding to the starting time of silence is greater than the editing duration, editing the to-be-edited video clip from the starting time of silence to obtain the edited video clip.

Figure 14:
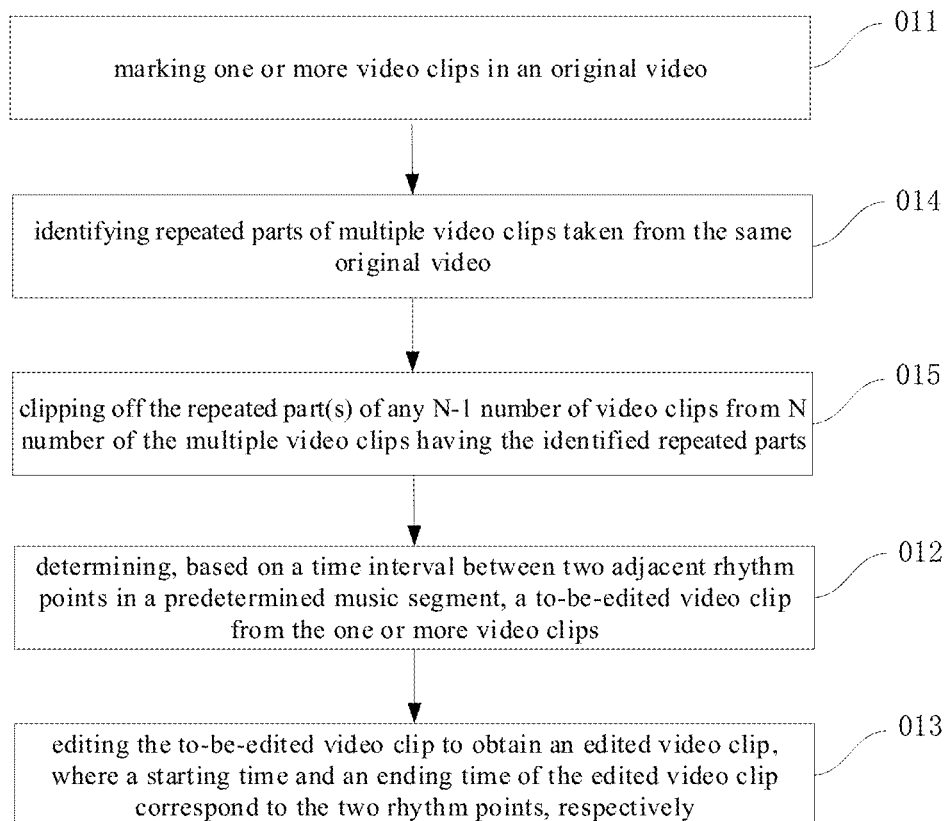
FIG. 14 is a schematic flowchart illustrating a video editing method according to some embodiments of the disclosure.

Referring to FIG. 14, in some embodiments, the video editing method may further include operations as follows. Repeated parts of a plurality of video clips taken from the same original video are identified. The repeated part(s) of any N−1 number of video clips from N number of the plurality of video clips having the identified repeated parts is/are clipped off, where N is a positive integer greater than 1.

Figure 18:
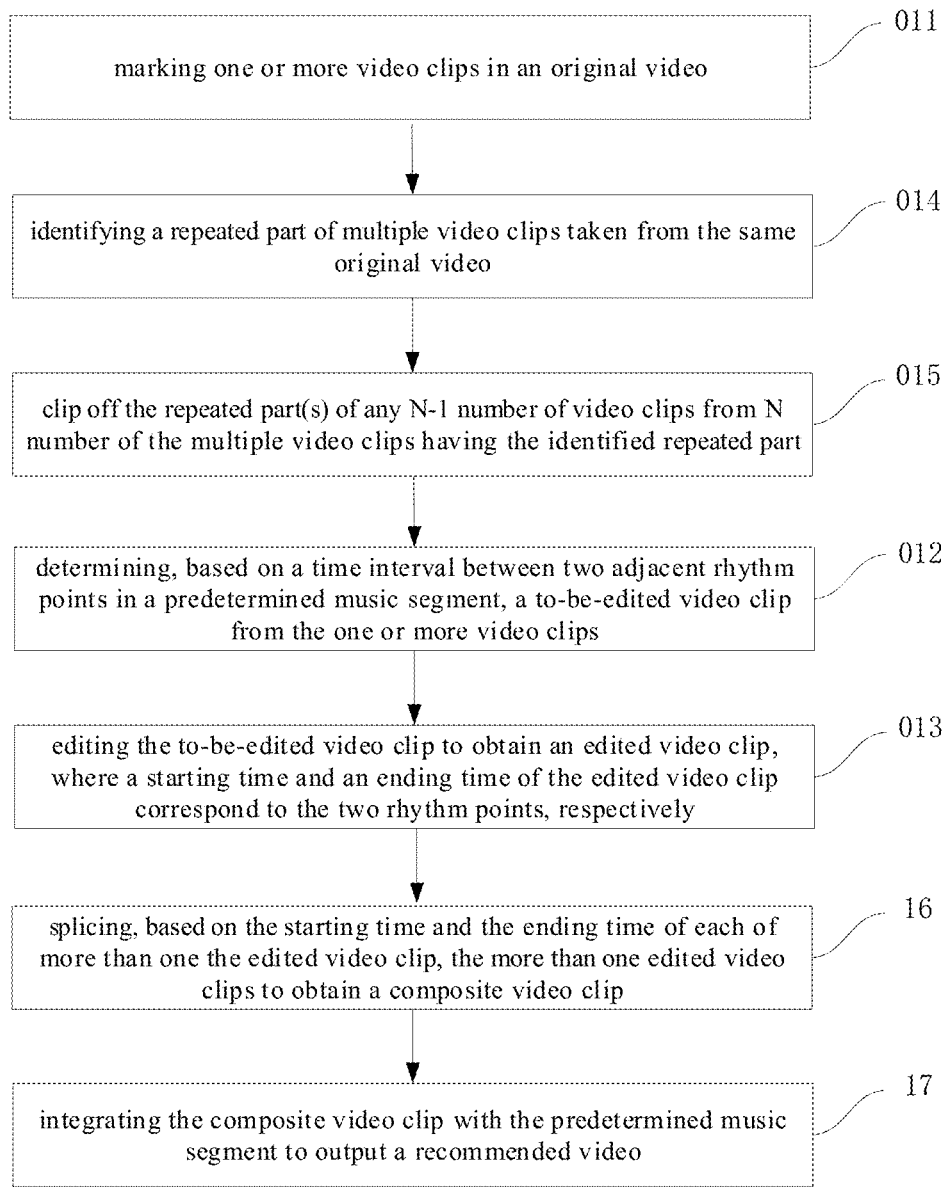
FIG. 18 is a schematic flowchart illustrating a video editing method according to some embodiments of the disclosure.

Referring to FIG. 18, in some embodiments, the video editing method may further include operations as follows. Based on the starting time and the ending time of each of more than one the edited video clip, the more than one edited video clips are spliced to obtain a composite video clip. The composite video clip is integrated with the predetermined music segment to output a recommended video.

Figure 3:
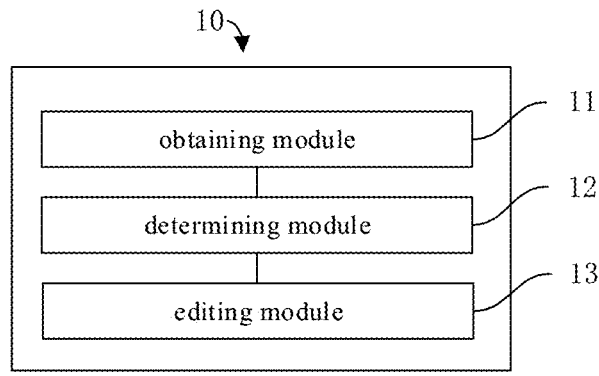
FIG. 3 is a schematic diagram illustrating modules of a video editing apparatus according to some embodiments of the disclosure.

Referring to FIG. 3, the video editing apparatus 10 provided by an embodiment of the disclosure includes an obtaining module 11, a determining module 12 and an editing module 13. An obtaining module 11 is configured (i.e., structured and arranged) to mark one or more video clips in an original video. A determining module 12 is configured to determine, based on a time interval between two adjacent rhythm points in a predetermined music segment, a to-be-edited video clip from the one or more video clips, where a duration of the to-be-edited video clip is greater than or equal to the time interval. An editing module 13 is configured to edit the to-be-edited video clip to obtain an edited video clip, where a starting time and an ending time of the edited video clip correspond to the two rhythm points, respectively.

Figure 6:
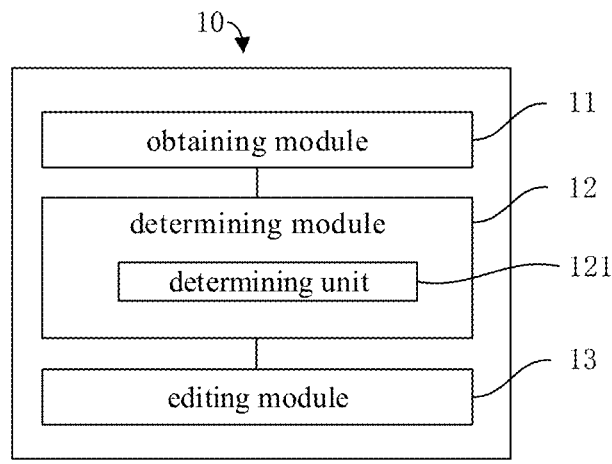
FIG. 6 is a schematic diagram illustrating modules of a video editing apparatus according to some embodiments of the disclosure.

Referring to FIG. 6, in some embodiments, the determining module 12 includes a determining unit 121. The determining unit 121 is configured to determine one of the one or more video clips, which has a duration greater than the time interval and is with a smallest one of all time differences corresponding to the one or more video clips, as the to-be-edited video clip, and each of the all time differences is a difference between the duration of each of the one or more video clips and the time interval.

Figure 8:
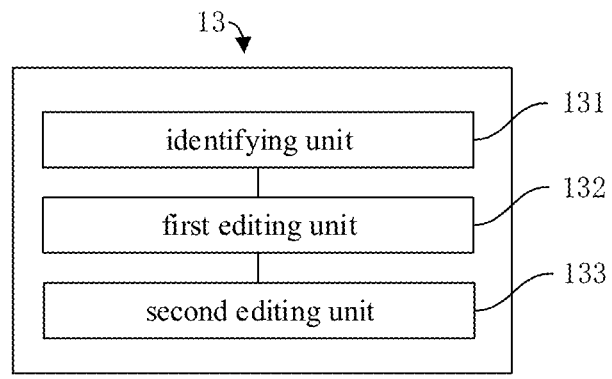
FIG. 8 is a schematic diagram illustrating modules of an editing module according to some embodiments of the disclosure.

Referring to FIG. 8, in some embodiments, the editing module 13 includes an identifying unit 131, a first editing unit 132 and a second editing unit 133. The identifying unit 131 is configured to identify a starting time of silence and an ending time of silence in the to-be-edited video clip. The first editing unit 132 is configured to in response to a first duration is greater than an editing duration, edit the to-be-edited video clip backwards from a starting time of the to-be-edited video clip to obtain the edited video clip; the first duration is a silence duration corresponding to the starting time of the to-be-edited video clip, and the editing duration is equal to a duration of a part of the to-be-edited video clip exceeding the time interval. The second editing unit 133 is configured to in response to a second duration is greater than the editing duration, edit the to-be-edited video clip forward from an ending time of the to-be-edited video clip to obtain the edited video clip, where the second duration is a silence duration corresponding to the ending time of the to-be-edited video clip.

Figure 11:
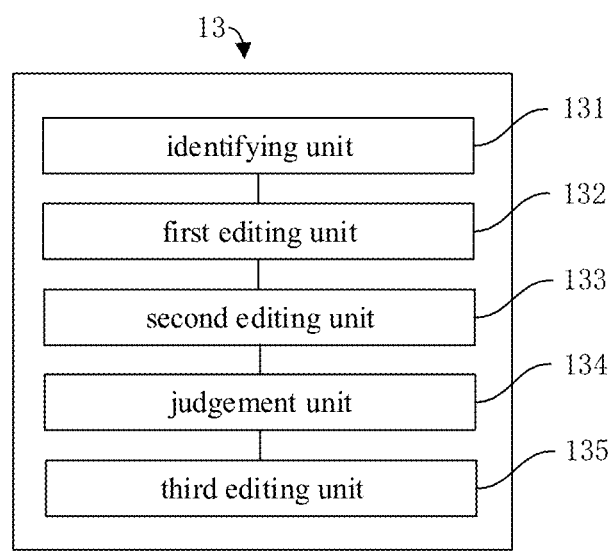
FIG. 11 is a schematic diagram illustrating modules of an editing module according to some embodiments of the disclosure.

Referring to FIG. 11, in some embodiments, the editing module 13 further includes a judgement unit 134 and a third editing unit 135. The judgement unit 134 is configured to in response to the first duration and the second duration are both less than the editing duration, determine whether a sum of the first duration and the second duration is greater than the editing duration. The third editing unit 135 is configured to in response to the sum of the first duration and the second duration is greater than the editing duration, edit the to-be-edited video clip from both the starting time of the to-be-edited video clip and the ending time of the to-be-edited video clip to obtain the edited video clip.

Figure 13:
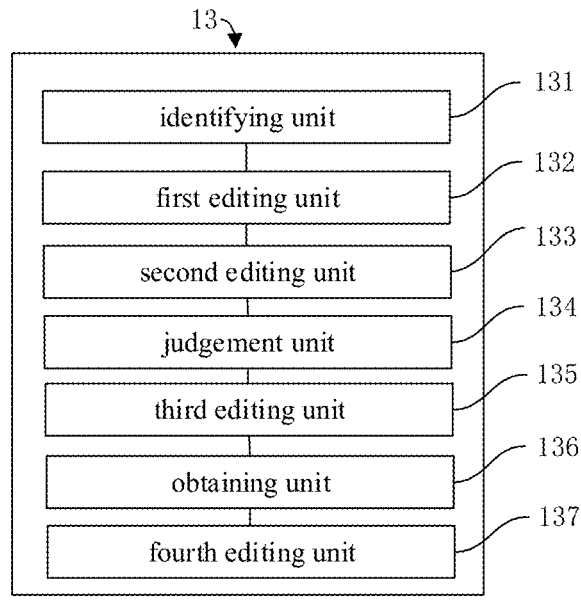
FIG. 13 is a schematic diagram illustrating modules of an editing module according to some embodiments of the disclosure.

Referring to FIG. 13, in some embodiments, the editing module 13 further includes an obtaining unit 136 and a fourth editing unit 137. The obtaining unit 136 is configured to in response to the sum of the first duration and the second duration is less than the editing duration, obtain a silence duration corresponding to the starting time of silence. The fourth editing unit 137 is configured to in response to the silence duration corresponding to the starting time of silence is greater than the editing duration, edit the to-be-edited video clip from the starting time of silence, to obtain the edited video clip.

Figure 2:
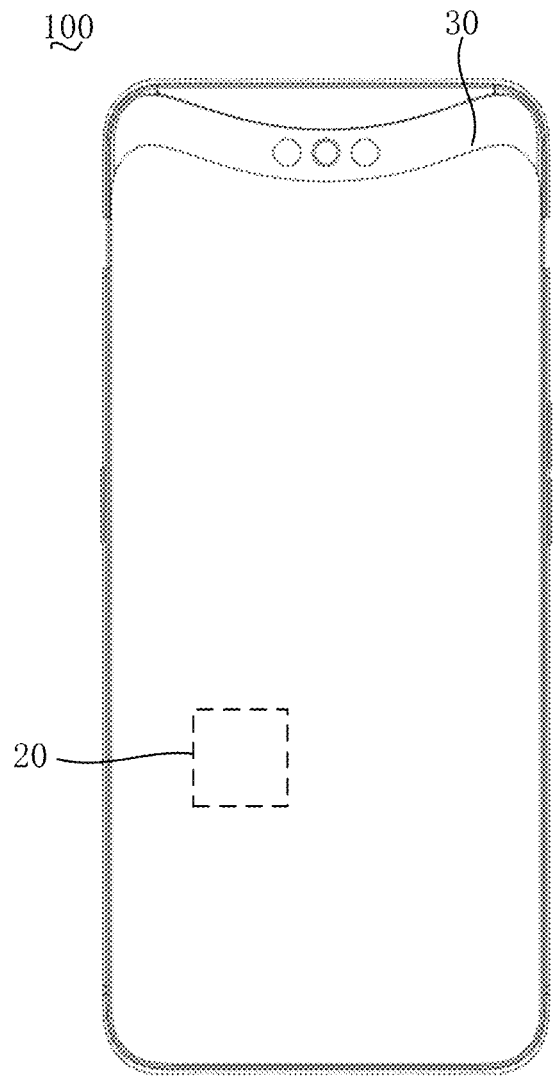
FIG. 2 is a schematic structural diagram illustrating a terminal according to some embodiments of the disclosure.

Referring to FIG. 2, the terminal 100 provided by an embodiment of the disclosure includes a processor 20. The processor 20 is configured to implement the following operations: marking one or more video clips in an original video; determining, based on a time interval between two adjacent rhythm points in a predetermined music segment, a to-be-edited video clip from the one or more video clips, where a duration of the to-be-edited video clip is greater than or equal to the time interval; and editing the to-be-edited video clip to obtain an edited video clip, where a starting time and an ending time of the edited video clip correspond to the two rhythm points, respectively.

In some embodiments, the processor 20 is further configured to implement operations including: determining one of the one or more video clips, which has a duration greater than the time interval and is with a smallest one of all time differences corresponding to the one or more video clips, as the to-be-edited video clip, where each of the all time differences is a difference between the duration of each of the one or more video clips and the time interval.

In some embodiments, the processor 20 is further configured to implement operations including: identifying a starting time of silence and an ending time of silence in the to-be-edited video clip; in response to a first duration is greater than an editing duration, editing the to-be-edited video clip backwards from a starting time of the to-be-edited video clip to obtain the edited video clip, where the first duration is a silence duration corresponding to the starting time of the to-be-edited video clip, and the editing duration is equal to a duration of a part of the to-be-edited video clip exceeding the time interval; and in response to a second duration is greater than the editing duration, editing the to-be-edited video clip forward from an ending time of the to-be-edited video clip to obtain the edited video clip, where the second duration is a silence duration corresponding to the ending time of the to-be-edited video clip.

In some embodiments, the processor 20 is further configured to implement operations including: in response to the first duration and the second duration are both less than the editing duration, determining whether a sum of the first duration and the second duration is greater than the editing duration; and in response to the sum of the first duration and the second duration is greater than the editing duration, editing the to-be-edited video clip from both the starting time of the to-be-edited video clip and the ending time of the to-be-edited video clip to obtain the edited video clip.

In some embodiments, the processor 20 is further configured to implement operations including: in response to the sum of the first duration and the second duration is less than the editing duration, obtaining a silence duration corresponding to the starting time of silence; and in response to the silence duration corresponding to the starting time of silence is greater than the editing duration, editing the to-be-edited video clip from the starting time of silence to obtain the edited video clip.

In some embodiments, the processor 20 is further configured to implement operations including: identifying repeated parts of a plurality of video clips taken from the same original video; and clipping off the repeated part(s) of any N−1 number of video clips from N number of the plurality of video clips having the identified repeated parts, where N is a positive integer greater than 1.

In some embodiments, the processor 20 is further configured to implement operations including: splicing, based on the starting time and the ending time of each of more than one the edited video clip, the more than one edited video clip to obtain a composite video clip; and integrating the composite video clip with the predetermined music segment to output a recommended video.

Referring to FIG. 2 and FIG. 18, a non-transitory computer-readable medium 300 provided by an embodiment of the disclosure stores computer-executable instructions 302. The computer-executable instructions 302, when executed by one or more processors 20, cause the or more processors 20 to perform a video editing method.

Referring to FIGS. 1, 2 and 3, the video editing method provided by the embodiment of the disclosure may begin from block 011 to block 013.

At block 011, one or more video clips are marked in an original video.

At block 012, a to-be-edited video clip is determined from the one or more video clips, based on a time interval between two adjacent rhythm points in a predetermined music segment, where a duration of the to-be-edited video clip is greater than or equal to the time interval.

At block 013, the to-be-edited video clip is edited to obtain an edited video clip, where a starting time and an ending time of the edited video clip correspond to the two rhythm points, respectively.

In some embodiments, the video editing apparatus 10 includes an obtaining module 11, a determining module 12 and an editing module 13. The obtaining module 11 is configured to mark one or more video clips in an original video. The determining module 12 is configured to determine, based on a time interval between two adjacent rhythm points in a predetermined music segment, a to-be-edited video clip from the one or more video clips, where a duration of the to-be-edited video clip is greater than or equal to the time interval, where a duration of the to-be-edited video clip is greater than or equal to the time interval. The editing module 13 is configured to edit the to-be-edited video clip to obtain an edited video clip, where a starting time and an ending time of the edited video clip correspond to the two rhythm points, respectively. In other words, blocks 011, 012 and 013 may be implemented by the obtaining module 11, the determining module 12 and the editing module 13, respectively.

In some embodiments, the terminal 100 may further include a processor 20. The processor 20 is configured to implement the following operations: marking one or more video clips in an original video; determining, based on a time interval between two adjacent rhythm points in a predetermined music segment, a to-be-edited video clip from the one or more video clips, where a duration of the to-be-edited video clip is greater than or equal to the time interval; and editing the to-be-edited video clip to obtain an edited video clip, where a starting time and an ending time of the edited video clip correspond to the two rhythm points, respectively.

The terminal 100 includes a housing 30 and a processor 20. The processor 20 is mounted on the housing 30. Specifically, the terminal 100 may be a mobile phone, a tablet computer, a display, a notebook computer, a teller machine, a gate machine, a smart watch, a head display device, a game machine and other devices. In an illustrated embodiment of the disclosure, it is illustrated by taking a case where the terminal 100 is the mobile phone as an example. It can be understood that the specific form of the terminal 100 is not limited to the mobile phone. The housing 30 may also be configured to install a functional module such as an imaging device, a power supply device, and a communication device of the terminal 100, so that the housing 30 provides protections such as dustproof, anti-drop, and waterproof for the functional module.

When the user captures a video with the mobile phone, the processor 20 may automatically classify the captured original video. The original video may be a temporary video. For example, the temporary video is sent to others through a chat software, and the temporary video does not require to be saved to a system album. Alternatively, the original video may also be a saved video, such as a video taken by the user with a system camera, or a video which is manually downloaded from the network and saved to the system album by the user.

Based on the content of the original videos, the processor 20 may classify the original videos into various categories such as selfie, landscape, pet, children, and gathering. The original video of the selfie type is determined in response to whether a ratio of the number of selfie image frames of the video to the number of all video frames is greater than a first preset ratio (for example, the first preset ratio is greater than ½), in which an image with an area proportion of human face area greater than a second preset ratio (for example, the second preset ratio is greater than ½) is defined as the selfie image. The original video of the landscape type is determined in response to whether a ratio of the number of landscape image frames of the video to the number of all video frames is greater than a third preset ratio (for example, the third preset ratio is greater than ⅔), in which an image without a portrait is defined as the landscape image. The original video of the pet type is determined in response to whether a ratio of the number of pet image frames in the video to the number of all video frames is greater than a fourth preset ratio (for example, the fourth preset ratio is greater than ⅔), in which an image with an area proportion of pet greater than a fifth preset ratio (for example, the fifth preset ratio is greater than ⅓) is defined as the pet image. The original video of the gathering type is determined in response to whether a ratio of the number of gathering image frames in the video to the number of all video frames is greater than a sixth preset ratio (for example, the sixth preset ratio is greater than ¾), in which an image containing multiple people is defined as the gathering image. In this way, the type of the original video may be quickly determined by performing the image recognition. It should be noted that the above values of the first preset ratio to the sixth preset ratio are for illustrative purposes only, and should not be construed as limitations to the disclosure.

After the type of the original video is determined, based on the type of the original video, the terminal 100 may mark one or more highlights of the original video to obtain one or more video clips, in which the highlights are high-quality video clips in the original video. For example, in the original video of the selfie type, the video clip containing human face may be determined as the high-quality video clip of the original video. For another example, with regard to the original video of the gathering type, the video clip containing multiple people may be determined as the high-quality video clip of the original video. For still another example, with regard to the original video of the pet type, the video clip containing the pet may be determined as the high-quality video clips of the original video. There are more examples not listed. Apparently, the user may manually select favorite video clips as the marked highlights.

The terminal 100 may store video parameters corresponding to the video clips in the video clip library; herein the video parameters may include a video path, a video type, and time information of the video clip in the corresponding original video, etc.; and the time information may include play starting time and play ending time. Regarding requiring to obtain a video clip, the video parameters corresponding to the video clip are first obtained from the video clip library, and then, based on the video parameters, the video clip is clipped from the corresponding original video. For example, the original video corresponding to the video clip is determined based on the video path of the video clip, and then the video clip is clipped, based on the time information of the video clip, from the corresponding original video. In this way, the video clip library only requires to store the video parameters corresponding to the video clip, instead of storing all video files of the video clips marked as the highlights. As such, a small storage space is required.

The terminal 100 may obtain one or more video clips. For example, the terminal 100 may obtain one or more video clips from multiple original videos having the same video type. Regarding editing the original videos, one or more video clips are clipped from the corresponding original videos, based on the video parameters of the selected video clips, and then the one or more video clips are spliced to generate a new edited video, i.e., a composite video clip. For example, multiple original videos of the selfie type are edited to generate an edited video of the selfie type. Alternatively, multiple original videos of the landscape type are edited to generate an edited video of the landscape type. Further alternatively, multiple original videos of the pet type are edited to generate an edited video of the pet type.

The edited video includes the one or more video clips taken from one or more original videos. The multiple video clips may be clipped from the same original video (for example, three video clips are taken from the same original video). Alternatively, the multiple video clips may be clipped from various original videos (for example, 1, 2 and 3 video clips are taken from three original videos, respectively). After the edited video has been generated, the edited video may be saved as the temporary video. The user may manually choose to save the edited video, when the user is satisfied with the edited video. Alternatively, the temporary edited video may be deleted, when the user is unsatisfied with the temporary edited video, or the user does not perform any operation on the temporary edited video within a certain time period. As such, an analysis may be performed to obtain the user's edited video preference. For example, when the user never saves the edited video of the landscape type, it may be determined that the user has a low likelihood of being interesting to the edited video of the landscape type, and then the edited video of the landscape type may be no longer generated. For another example, when the user saves all the edited video of the selfie type, it may be determined that the edited video of the selfie type is likely of interest to the user, and then, more edited videos of the selfie type may be generated.

In order to increase the expressiveness and impact of the edited video, the processor 20 may match the edited video with background music. The background music may mobilize the emotions of the viewer, which plays an enormous role in video editing. The edited video matched with suitable background music can greatly improve the expressiveness and impact. The background music is a piece of music played synchronously with the playing of the edited video. In the embodiments of the disclosure, the predetermined music segment, i.e., the background music, and the edited video are played synchronously. As such, the predetermined music segment is taken as the background music of the edited video. Regarding obtaining the predetermined music segment (i.e., the background music), a suitable piece of music taken from a preset background music library in the terminal 100 or the cloud may be determined as the background music, based on the types of the multiple to-be-edited original videos. Alternatively, a piece of music taken from the music downloaded by the user, or from the music frequently played by the user, may be determined as the background music. Further alternatively, the user may manually create a background music library and store favorite background music in the background music library. Regarding obtaining the background music, the processor 20 may select a suitable piece of music from the background music library, and the suitable piece of music is taken as background music.

The video clip includes an original audio segment, which includes speech voice, environmental noise, background music, etc. In order to prevent the background music of the video clip and the predetermined music segment from being played simultaneously, which reduces the viewing effect of the edited video, the background music in the video clip may be recognized and be muted in the audio segment, so that the video clip only remains the speech voice and the environmental noise. As such, it enables to simultaneously play the edited video generated based on the video clips and the predetermined music segment with only the predetermined music segment being played as the background music, which achieves a good viewing effect of the edited video.

A piece of music generally includes rhythm points, which are key time points obtained based on fluctuation or rhythm of the music. For example, the rhythm points may be drum points or beat points of the music. Specifically, people may beat time with the music rhythm when enjoying the music, and the beat points may be taken as the rhythm points. For another example, based on the frequency spectrum of the background music, the rhythm points of the background music may be obtained through the frequency-domain analysis, in which an obvious frequency spectrum change generally occurs at a position corresponding to the rhythm point. With regard to the music in the background music library, the rhythm points in the music may be determined in advance. The processor 20 may obtain rhythm point information together with the background music, thereby improving the efficiency of video editing.

After the background music and rhythm point information thereof are obtained, the processor 20 determines a video clip from the video clip library, that is matched with two adjacent rhythm points, and takes the video clip as the to-be-edited video clip. For example, for every two adjacent rhythm points in the predetermined music segment, the to-be-edited video clip matched with the two adjacent rhythm points is determined. It can be understood that the closer the duration of the video clip is to the time interval between the two adjacent rhythm points, the less the clipped-off portion required to the video clip. Thus, the processor 20 may determine a video clip from the video clip library, which is matched with the time interval between the two adjacent rhythm points, as the to-be-edited video clip corresponding to the two adjacent rhythm points. For example, the video clip with a smallest one of all time difference corresponding to the one or more video clips is determined as the to-be-edited video clip, where each of the time differences is a difference between the duration of each of the one or more video clip and the time interval. In this way, when editing the to-be-edited video clip, it only requires to take the part corresponding to the time interval from the to-be-edited video clip (that is, only the part of the to-be-edited video clip exceeding the time interval is required to be clipped off). Compared with editing other video clips, editing the to-be-edited video clip with the smallest time difference requires less video content to be clipped off. As such, the completeness of the edited video clip (i.e., the remaining part of the to-be-edited video clip after clipping off the part of the to-be-edited video clip exceeding the time interval) can be ensured as far as possible. In the example shown in FIG. 4, there are three to-be-edited video clips, i.e., video clips A, B, and C. A duration of the video clip A is 6 seconds, a duration of the video clip B is 8 seconds, and a duration of the video clip C is 10 seconds. A background music M includes four rhythm points (i.e., S1, S2, S3 and S4). A time interval between the rhythm point S1 and the rhythm point S2 is 5.5 seconds, a time interval between the rhythm point S2 and the rhythm point S3 is 9.5 seconds, a time interval between the rhythm point S3 and the rhythm point S4 is 7.5 seconds. By performing a simple calculation, the video clip A (hereinafter referred to as the to-be-edited video clip A) is determined as the video clip with the smallest one of all time differences between the durations of the respective video clips and the time interval between the rhythm point S1 and the rhythm point S2; the video clip C (hereinafter referred to as the to-be-edited video clip C) is determined as the video clip with the smallest one of all time differences between the durations of the respective video clips and the time interval between the rhythm point S2 and the rhythm point S3; and the video clip B (hereinafter referred to as the to-be-edited video clip B) is determined as the video clip with the smallest one of time differences between the durations of the respective video clips and the time interval between the rhythm point S3 and the rhythm point S4. In video editing, for each of the to-be-edited video clips, only the part of the video clip exceeding the time interval is required to be clipped off, and the part of the video clip corresponding to the time interval is remained. For example, a part a of the video clip A is clipped off, and the other part of the video clip A except for the part a is remained; a part b of the video clip B is clipped off, and the other part of the video clip B except for the part b is remained; and a part c of the video clip C is clipped off, and the other part of the video clip C except for the part c is remained. The durations of the clipped parts a, b and c all are 0.5 seconds, limited video content is clipped off, and the durations of the remaining parts are exactly equal to the corresponding time intervals, respectively.

After the editing has been completed, the duration of the obtained edited video clip A' (i.e., the part of the video clip A except for the part a) is exactly equal to the time interval between the rhythm point S1 and the rhythm point S2; the duration of the obtained edited video clip C' (i.e., the part of the video clip C except for the part c) is exactly equal to the time interval between the rhythm point S2 and the rhythm point S3; and the duration of the obtained edited video clip B' (i.e., the part of the video clip B except for the part b) is exactly equal to the time interval between the rhythm point S3 and the rhythm point S4. The starting time and the ending time of the edited video clip coincide with the two corresponding rhythm points, respectively, so that the edited video clips and the background music corresponding to the two rhythm points can be played synchronously.

The process of manual video editing takes a lot of user time and effort, and the editing is inefficient.

The video editing method, the video editing apparatus, and the terminal 100 according to embodiments of the disclosure enable that the one or more video clips matched with the adjacent rhythm points may be determined based on the time interval between the adjacent rhythm points of the background music, so as to match each video clip with the adjacent rhythm points, clip off limited video content, and ensure the completeness of each video clip. The video clips are matched with the rhythm points of the background music without artificial operation, which saves the user time and effort and achieve a high editing efficiency.

Referring to FIGS. 2, 5 and 6, in some embodiments, block 012 includes block 0121.

At block 0121, one of the one or more video clips, which has a duration greater than the time interval and is with a smallest one of all time differences corresponding to the one or more video clips, are determined as the to-be-edited video clip, where each of the all time differences is a difference between the duration of each of the one or more video clips and the time interval.

In some embodiments, the determining module 12 includes a determining unit 121. The determining unit 121 is configured to determine one of the one or more video clips, which has a duration greater than the time interval and is with a smallest one of all time differences corresponding to the one or more video clips, as the to-be-edited video clip, in which each of the all time differences is a difference between the duration of each of the one or more video clips and the time interval. In other words, block 0121 may be implemented by the determining module 121.

In some embodiments, the processor 20 is configured to implement operations including: determining one of the one or more video clips, which has a duration greater than the time interval and is with a smallest one of all time differences corresponding to the one or more video clips, as the to-be-edited video clip, where each of the all time differences is a difference between the duration of each of the one or more video clips and the time interval. In other words, block 014 may be implemented by the processor 20.

Figure 4:
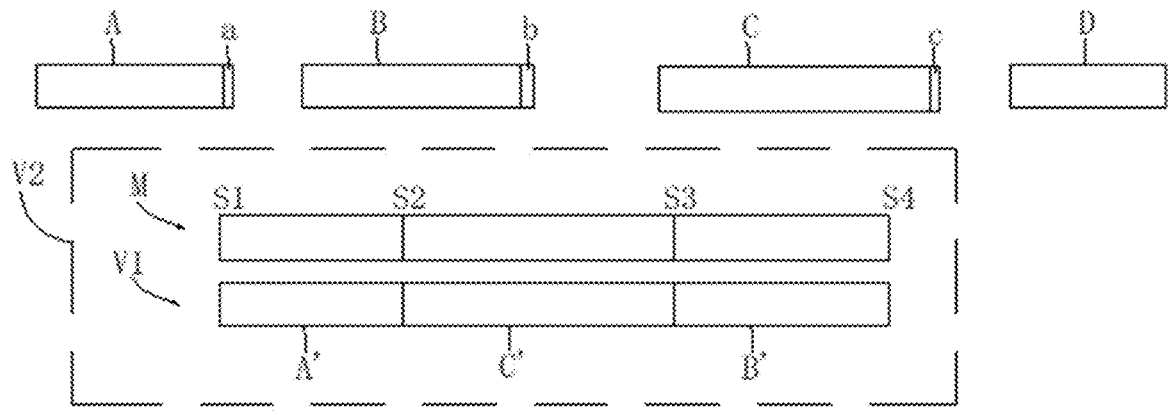
FIG. 4 is a schematic principle diagram illustrating a video editing method according to some embodiments of the disclosure.

Specifically, referring to FIG. 4, regarding determining a video clip matched with the time interval between the rhythm points S3 and S4 from the video clip library, in response to determining that a duration of the video clip is less than the time interval between the rhythm points S3 and S4 (for example, a duration of a video clip D is 6 seconds, which is less than 7.5 seconds), matching the video clip D with the rhythm points S3 and S4 does not require any editing operation on the video clip D. However, in this case, there is a problem of playing the background music without displaying the corresponding video content. Thus, regarding matching the video clip with two adjacent rhythm points, the video clip, which has duration less than the time interval, cannot be taken as the to-be-edited video clip.

When the duration of the video clip is greater than the time interval, in order to clip off the least video clip content, upon determining the smallest time difference among the time differences between duration of each video clip and the time interval, the video clip corresponding to the smallest time difference is determined as the to-be-edited video clip. For example, regarding determining the to-be-edited video clip corresponding to the rhythm points S1 and S2 in FIG. 4, the time difference between the duration of the video clip A and the time interval is 0.5 seconds, the time difference between the duration of the video clip B and the time interval is 2.5 seconds, and the time difference between the duration of the video clip C and the time interval is 4.5 seconds, where the time interval is the duration between the rhythm points S1 and S2. In this case, the video clip A with the smallest time difference is taken as the to-be-edited video clip corresponding to the rhythm points S1 and S2, and the video content which requires to be clipped off is the least. Certainly, in response to determining the duration of the video clip is equal to the time interval, the video clip may be determined as the to-be-edited video clip corresponding to the time interval without editing. In this case, the video clip is complete, and the background music is prevented from being played without displaying the corresponding video content.

Referring to FIGS. 2, 7 and 8, in some embodiments, block 013 includes blocks 0131, 0132 and 0133.

At block 0131, a starting time of silence and an ending time of silence in the to-be-edited video clip are identified.

At block 0132, in response to a first duration is greater than an editing duration, the to-be-edited video clip is edited backwards from a starting time of the to-be-edited video clip to obtain the edited video clip, where the first duration is a silence duration corresponding to the starting time of the to-be-edited video clip, and the editing duration is equal to a duration of a part of the to-be-edited video clip exceeding the time interval.

At block 0133, in response to a second duration is greater than the editing duration, the to-be-edited video clip is edited, forward from an ending time of the to-be-edited video clip, to obtain the edited video clip, where the second duration is a silence duration corresponding to the ending time of the to-be-edited video clip.

In some embodiments, the editing module 13 includes an identifying unit 131, a first editing unit 132 and a second editing unit 133. The identifying unit 131 is configured to identify a starting time of silence and an ending time of silence in the to-be-edited video clip. The first editing unit 132 is configured to in response to a first duration is greater than an editing duration, edit the to-be-edited video clip backwards from a starting time of the to-be-edited video clip to obtain the edited video clip; the first duration is a silence duration corresponding to the starting time of the to-beedited video clip, and the editing duration is equal to a duration of a part of the to-be-edited video clip exceeding the time interval. The second editing unit 133 is configured to in response to a second duration is greater than the editing duration, edit the to-be-edited video clip forward from an ending time of the to-be-edited video clip to obtain the edited video clip, where the second duration is a silence duration corresponding to the ending time of the to-be-edited video clip. In other words, blocks 0131, 0132, and 0133 may be implemented by the identifying unit 131, the first editing unit 132 and the second editing unit 133, respectively.

In some embodiments, the processor 20 is further configured to implement operations including: identifying a starting time of silence and an ending time of silence in the to-be-edited video clip; in response to a first duration is greater than an editing duration, editing the to-be-edited video clip backwards from a starting time of the to-be-edited video clip to obtain the edited video clip, where the first duration is a silence duration corresponding to the starting time of the to-be-edited video clip, and the editing duration is equal to a duration of a part of the to-be-edited video clip exceeding the time interval; in response to a second duration is greater than the editing duration, editing the to-be-edited video clip forward from an ending time of the to-be-edited video clip to obtain the edited video clip, where the second duration is a silence duration corresponding to the ending time of the to-be-edited video clip. In other words, blocks 0131, 0132, and 0133 may be implemented by the processor 20.

Specifically, it can be understood that with regard to the editing of the to-be-edited video clip, the part of the to-be-edited video clip corresponding to the time interval is clipped from the to-be-edited video clip (that is, the part of the to-be-edited video clip exceeding the time interval is clipped off). In this case, the editing position may exactly locate at a position where a sentence is not finished, and performing the editing at such editing position may result in clipping off a part of a complete speech in the to-be-edited video clip, which leads to an undesirable viewing effect. Therefore, before the editing, the processor 20 may first identify the starting time of silence and the ending time of silence in the to-be-edited video clip, in which the ending time of silence indicates the moment in the video clip when a person begins to speak, and the starting time of silence indicates the moment in the video clip when the person finishes speaking. In order to prevent pauses (such as hesitation, stuttering, and breathing) in a complete speech from being taken as the ending time of the silence, which results in clipping off a part of the complete speech, in response to determining no more voice during a preset time followed by a moment in the speech of the person, the processor 20 may determine the moment as the ending time of silence. As such, the starting time of silence and the ending time of silence can be accurately determined.

Figure 9:
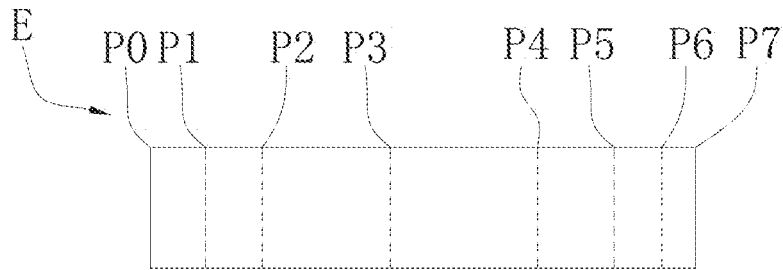
FIG. 9 is a schematic principle diagram illustrating a video editing method according to some embodiments of the disclosure.

Referring to FIG. 9, it is illustrated to take a case where a video clip E includes 4 starting times of silence (P0, P2, P4, and P6) and 3 ending times of silence (P1, P3, and P5), and the editing duration of the video clip E is 0.5 seconds as an example. In response to the silence duration corresponding to the starting time P0 (i.e., the first duration P0P1) is greater than or equal to the editing duration, it indicates that there is no more voice from the starting time P0 of the video clip to the ending time of silence P1, which is closest to the starting time P0. In this case, the to-be-edited video clip is edited backwards from the starting time P0 (i.e., in a direction towards ending time P7), to clip off a part of the to-be-edited video clip corresponding to the editing duration. As such, the entire clipped off part is within the silence duration corresponding to the starting time P0, which does not affect the completeness of the speech. It should be noted that, the coincidence of the starting time of silence P0 and the starting time P0 of the video clip is just an example illustrated in FIG. 9. In practice, the starting time of the video clip may also be identified as the ending time of silence. For example, when a person begins to speak at the starting time P0 of the video clip, the starting time P0 of the video clip is determined as the ending time of silence (that is, there is no silence duration corresponding to the starting time P0), and the editing cannot be performed from the starting time P0. Thus, in response to determining that there is a silence duration corresponding to the starting time P0, and the first duration P0P1 is greater than or equal to the editing duration, the processor 20 may edit the to-be-edited video clip backwards from the starting time of the to-be-edited video clip, to obtain the part of the to-be-edited video clip exceeding the time interval, that is, the video content corresponding to the editing duration is clipped off backwards from the starting time.

In response to the silence duration corresponding to the ending time P7 of the video clip (i.e., a second duration P6P7) is greater than or equal to the editing duration, it indicates that there is no more voice between the ending time P7 of the video clip and the silence starting time P6, which is closest to the ending time P7 of the video clip. In this case, the to-be-edited video clip is edited forwards from the ending time P7 (i.e., in a direction towards the starting time P0), to clip off a part of the to-be-edited video clip corresponding to the editing duration. As such, the entire clipped off part is within the silence duration corresponding to the ending time P7, which also does not affect the completeness of the speech. In response to there is an ending time of silence between the silence starting time P6 and the ending time P7, and there is no starting time of silence between the silence starting time P6 and the ending time P7, it indicates that the speech lasts for a duration between the ending time of silence and the ending time P7 (that is, there is no silence duration corresponding to the ending time P7), and the editing cannot be performed from the ending time P7. Thus, in response to a silence duration corresponds to the ending time P7, and the second duration P6P7 is greater than or equal to the editing duration, the processor 20 may clip the to-be-edited video forward from the ending time of the to-be-edited video clip, to obtain the part of the to-be-edited video clip exceeding the time interval, that is, the video content corresponding to the editing duration is clipped off forward from the ending time. In this way, the part of the video clip exceeding the interval duration is clipped off, while ensuring the completeness of the speech in the video clip.

Referring to FIGS. 2, 10 and 11, in some embodiments, block 013 further includes blocks 0134 and 0135.

At block 0134, in response to the first duration and the second duration are both less than the editing duration, it is determined whether a sum of the first duration and the second duration is greater than the editing duration.

At block 0135, in response to the sum of the first duration and the second duration is greater than the editing duration, the to-be-edited video clip is edited from both the starting time of the to-be-edited video clip and the ending time of the to-be-edited video clip to obtain the edited video clip.

In some embodiments, the editing module 13 further includes a judgement unit 134 and a third editing unit 135. The judgement unit 134 is configured to in response to the first duration and the second duration are both less than the editing duration, determine whether a sum of the first duration and the second duration is greater than the editing duration. The third editing unit 135 is configured to in response to the sum of the first duration and the second duration is greater than the editing duration, edit the to-be-edited video clip from both the starting time of the to-be-edited video clip and the ending time of the to-be-edited video clip to obtain the edited video clip. In other words, blocks 0134 and 135 may be implemented by the judgement unit 134 and the third editing unit 135, respectively.

In some embodiments, the processor 20 is further configured to implement operations including: in response to the first duration and the second duration are both less than the editing duration, determining whether a sum of the first duration and the second duration is greater than the editing duration; and in response to the sum of the first duration and the second duration is greater than the editing duration, editing the to-be-edited video clip from both the starting time of the to-be-edited video clip and the ending time of the to-be-edited video clip to obtain the edited video clip.

Specifically, referring to FIG. 9, when the first duration P0P1 and the second duration P6P7 are both less than the editing duration (for example, the editing duration is 2 seconds, the first duration P0P1=1.5 seconds, and the second duration P6P7=1 second), whether editing the video content corresponding to the editing duration backwards from the starting time or forward from the ending time, it will destroy the completeness of the speech. Thus, the processor 20 may determine whether a sum of the first duration P0P1 and the second duration P6P7 is greater than the editing duration. In response to the sum of the first duration P0P1 and the second duration P6P7 is greater than or equal to the editing duration (for example, in FIG. 9, P0P1+P6P7=2.5 seconds>2 seconds), the processor 20 may edit the to-be-edited video clip backwards from the starting time P0 to clip off a first editing duration, which is less than or equal to the first duration P0P1 (for example, the first editing duration is 1 second), and the processor 20 may further edit the to-be-edited video clip forward from the ending time P7 to clip off a second editing duration, which is less than or equal to the second duration P6P7 (for example, the second editing duration is 1 second). As such, the sum of the first editing duration and the second editing duration is exactly equal to the editing duration, thereby obtaining the edited video clip.

In this way, the processor 20 may edit the video clip from both the starting time P0 and the ending time P7 to clip off the part of the video clip exceeding the time interval, in response to determining the first duration P0P1 and the second duration P6P7 are both less than the editing duration and the sum of the first duration P0P1 and the second duration P6P7 is greater than or equal to the editing duration. As such, the part of the video remained after the editing (i.e., the edited video clip) is guaranteed to correspond to the time interval, which can ensure the completeness of the speech in the edited video clip.

Referring to FIGS. 2, 12 and 13, in some embodiments, block 013 further includes blocks 0136 and 0137.

At block 0136, in response to the sum of the first duration and the second duration is less than the editing duration, a silence duration corresponding to the starting time of silence is obtained.

At block 0137, in response to the silence duration corresponding to the starting time of silence is greater than the editing duration, the to-be-edited video clip is edited from the starting time of silence to obtain the edited video clip.

In some embodiments, the editing module 13 further includes an obtaining unit 136 and a fourth editing unit 137. The obtaining unit 136 is configured to in response to the sum of the first duration and the second duration is less than the editing duration, obtain a silence duration corresponding to the starting time of silence. The fourth editing unit 137 is configured to in response to the silence duration corresponding to the starting time of silence is greater than the editing duration, edit the to-be-edited video clip from the starting time of silence, to obtain the edited video clip. In other words, blocks 0136 and 0137 may be implemented by the obtaining unit 136 and the fourth editing unit 137, respectively.

In some embodiments, the processor 20 is further configured to implement operations including: in response to the sum of the first duration and the second duration is less than the editing duration, obtaining a silence duration corresponding to the starting time of silence; and in response to the silence duration corresponding to the starting time of silence is greater than the editing duration, editing the to-be-edited video clip from the starting time of silence to obtain the edited video clip. In other words, blocks 0136 and 0137 may be implemented by the processer 20.

Figure 15:
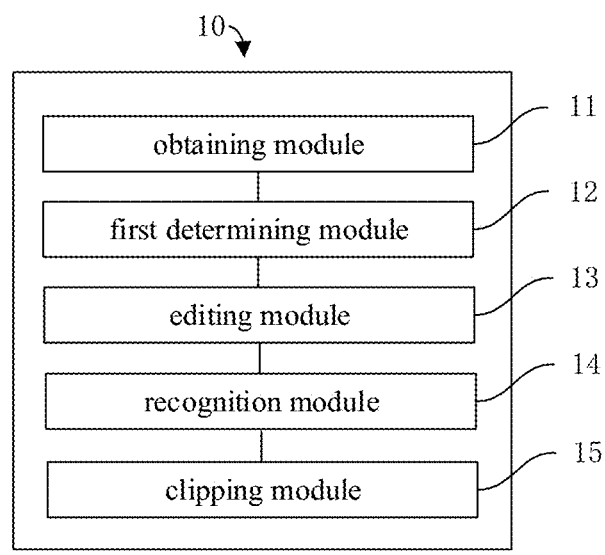
FIG. 15 is a schematic diagram illustrating modules of an editing module according to some embodiments of the disclosure.

Specifically, referring to FIG. 9, it is illustrated by taking the case where the editing duration is 3 seconds as an example. In response to the first duration P0P1 and the second duration P6P7 are both less than the editing duration and the sum of the first duration P0P1 and the second duration P6P7 is less than the editing duration, it will destroy the completeness of the speech of the edited video clip, whether editing the video clip backwards from the starting time P0 or forward from the ending time P7, or editing the video clip backwards from the starting time and forward from the ending time, respectively. Thus, for each of the starting times of silence (P0, P2, P4, and P6), the processor 20 may first obtain the silence duration corresponding to the starting time of silence (i.e., the duration from the starting time of silence to the ending time of silence, such as, the silence duration P0P1=1.5 seconds, the silence duration P2P3=3.5 seconds, the silence duration P4P5=1.4 seconds, and the silence duration P6P7=1 second). Then, the processor 20 may select any one of the silence durations which is greater than the editing duration. For example, the silence duration P2P3 is selected, and video clip is edited from the starting time of silence P2 of the silence duration P2P3 to clip off the video content corresponding to the editing duration (for example, the editing duration is 3 seconds). As such, the entire clipped off part is within the silence duration, which does not affect the completeness of the speech in the edited video clip. At last, the processor 20 splices the two parts of the video clip remained after the editing together to obtain one edited video clip, and the duration of the edited video clip is equal to the duration of the time interval between the two corresponding rhythm points Referring to FIGS. 2, 14 and 15, in some embodiments, the video editing method further carries out operations of blocks 014 and 015.

At block 014, repeated parts of multiple video clips taken from the same original video are identified.

At block 015, the repeated part(s) of any N−1 number of video clips from N number of multiple video clips having the identified repeated parts is/are clipped off, where N is a positive integer greater than 1.

In some embodiments, the video editing apparatus 10 further includes a recognition module 14 and a clipping module 15. The recognition module 14 is configured to identify repeated parts of a plurality of video clips taken from the same original video. The clipping module 15 is configured to clip off the repeated part(s) of any N−1 number of video clips from N number of the plurality of video clips having the identified repeated parts, where N is a positive integer greater than 1. In other words, block 014 and block 015 may be implemented by the recognition module 14 and the editing module 13, respectively.

In some embodiments, the processor 20 is further configured to implement operations including: identifying repeated parts of a plurality of video clips taken from the same original video; and clipping off the repeated part(s) of any N−1 number of video clips from N number of the plurality of video clips having the identified repeated parts, where N is a positive integer greater than 1.

Figure 16:
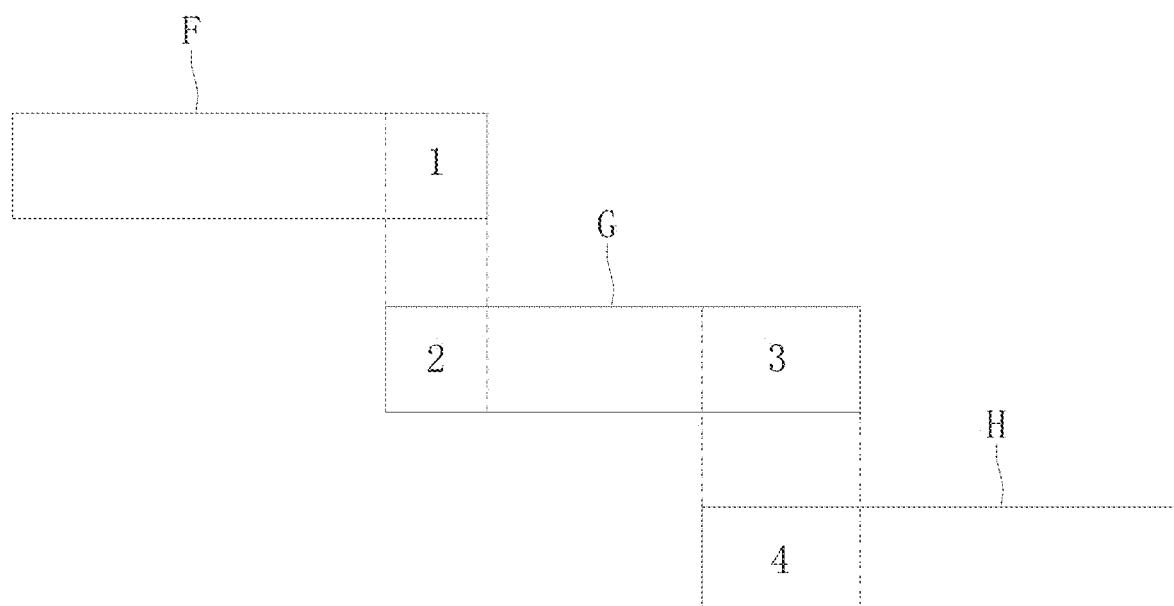
FIG. 16 is a schematic principle diagram illustrating a video editing method according to some embodiments of the disclosure.
Figure 17:
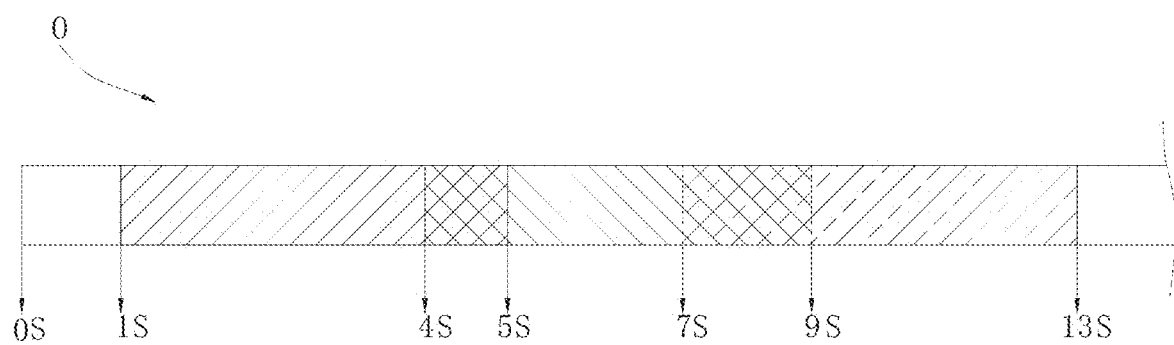
FIG. 17 is a schematic principle diagram illustrating a video editing method according to some embodiments of the disclosure.

Specifically, before the editing, a number of video clips obtained by the processor 20 may include multiple video clips taken from the same original video, and the multiple video clips taken from the same original video may include repeated parts. When the edited video includes multiple video clips with the repeated parts, the repeated parts will be played several times during the playing of the edited video. Generally, a user does not want to view the repeated part for a second time, such that playing the repeated part repeatedly may reduce the expressiveness and the impact of the edited video. Therefore, the processor 20 may first identify the repeated parts in the multiple video clips taken from the same original video. Regarding comparing the video clips to determine whether the multiple video clips include the repeated parts, the processor 20 may first obtain the video information (such as the video path) of each video clip, and determine, based on the video path, the original video corresponding to each video clip. The multiple video clips with the same path indicates that the multiple video clips are taken from the same original video, while the video clips taken from different original videos generally do not include a repeated part. Therefore, in the embodiments, the processor 20 only performs comparison on the multiple video clips taken from the same original video to identify the repeated parts. It can be understood that, when multiple video clips are selected, the processor 20 may obtain the time information of each video clip displayed in the original video (such as the play starting time and the play ending time). After the play starting time and the play ending time of each video clip in the original video are obtained, the processor 20 may determine whether there is an overlap between time periods from the respective play starting time to the respective play ending time of two video clips. The overlap between the time periods from the respective play starting time to the respective play ending time of the two video clips indicates that the two video clips contain the identical repeated parts. For example, as illustrated in FIG. 16, a part of an original video O between $1^{st}$ second and $5^{th}$ second is taken as a video clip F (that is, the play starting time of the video clip F is at the $1^{st}$ second, and the play ending time of the video clip F is at the $5^{th}$ second), where the original video O illustrated in FIG. 17; a part of the original video O between $4^{th}$ second and $9^{th}$ second is taken as a video clip G (that is, the play starting time of the video clip G is at the 4th second, and the play ending time of the video clip G is at the $9^{th}$ second); and a part of the original video O between $7^{th}$ second and 13th second is taken as a video clip H (that is, the play starting time of the video clip H is at the $7^{th}$ second, and the play ending time of the video clip H is at the $13^{th}$ second). A part marked as "1" of the video clip F and a part marked as "2" of the video clip G are overlapped. Both the part marked as "1" and the part marked as "2" are the video clip corresponding to the original video between $4^{th}$ and $5^{th}$ seconds and, therefore are taken as the repeated parts. A part marked as "3" of the video clip G and a part marked as "4" of the video clip H are overlapped. Both the part marked as "3" and the part marked as "4" are the video clip between $7^{th}$ and $9^{th}$ second of the original video, and are taken as the repeated parts. As such, the repeated parts can be quickly determined without performing image recognition to compare the video content of each video clip.

After the repeated parts are determined, the processor 20 clips off the repeated part(s) of any N−1 number of video clips (i.e., the two video clips marked as G and H) from N number of video clips (i.e., the 3 video clips illustrated in FIG. 16) having the determined repeated parts, and the repeated part of only one of the video clips (i.e., the video clip F) is reserved. In this way, after the more than one edited video clips are spliced based on the rhythm points, the identical repeated parts are only played once in the playing of the edited video, such that the user viewing experience is good.

Figure 19:
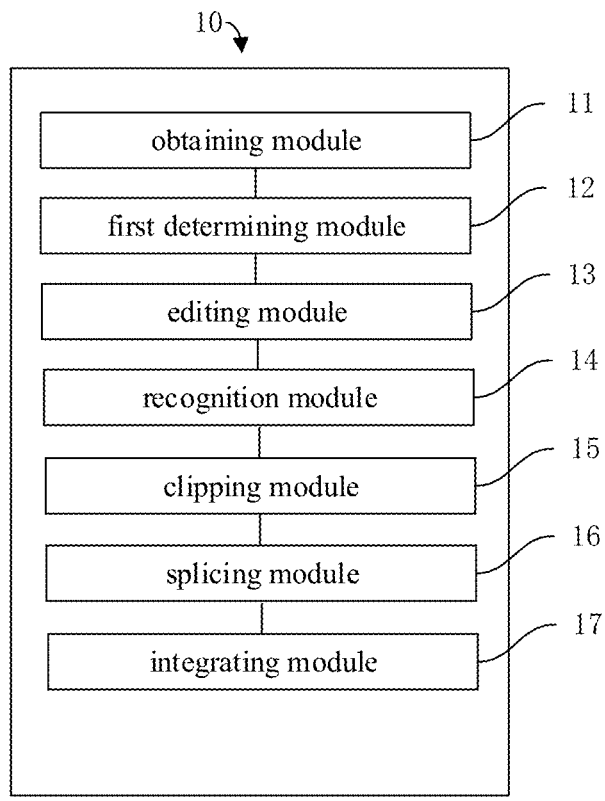
FIG. 19 is a schematic diagram illustrating modules of an editing module according to some embodiments of the disclosure.
Figure 20:
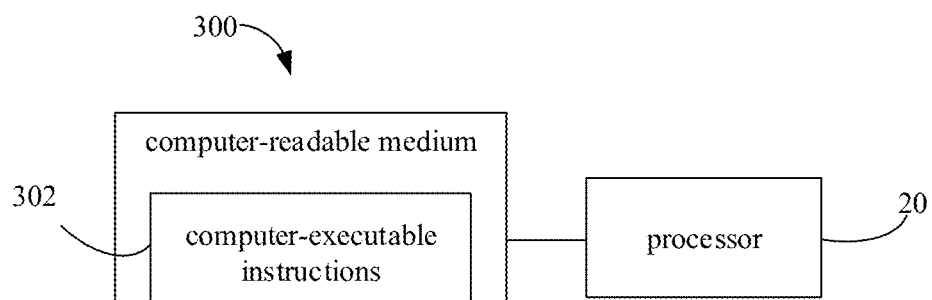
FIG. 20 is a schematic diagram illustrating a connection between a processor and a computer-readable storage medium according to some embodiments of the disclosure.

Referring to FIGS. 2, 18 and 19, in some embodiments, the video editing method further includes operations of blocks 016 and 017.

At block 016, based on the starting time and the ending time of each of more than one the edited video clip, the more than one edited video clips are spliced to obtain a composite video clip.

At block 017, the composite video clip is integrated with the predetermined music segment to output a recommended video.

In some embodiments, the video editing apparatus 10 further includes a splicing module 16 and an integrating module 17. The splicing module 16 is configured to splice, based on the starting time and the ending time of each of more than one the edited video clip, the more than one edited video clips to obtain a composite video clip. The integrating module 17 is configured to integrate the composite video clip with the predetermined music segment to output a recommended video. In other words, blocks 16 and 17 may be implemented by the splicing module 16 and the integrating module 17, respectively.

In some embodiments, the processor 20 is further configured to implement operations including: splicing, based on the starting time and the ending time of each of more than one the edited video clip, the more than one edited video clips to obtain a composite video clip; and integrating the composite video clip with the predetermined music segment to output a recommended video. In other words, blocks 16 and 17 may be implemented by the processor 20.

Specifically, referring to FIG. 4, the starting time and the ending time of the edited video clip A' correspond to the rhythm points S1 and S2, respectively; the starting time and the ending time of the edited video clip B' correspond to the rhythm points S3 and S4, respectively; and the starting time and the ending time of the edited video clip C' correspond to the rhythm points S2 and S3, respectively. The processor 20 may splice the edited video clip A', the edited video clip B' and the edited video clip C' to obtain a new composite video clip V1, based on the sequence of the starting times and the ending times of the edited video clips (i.e., the sequence of the corresponding rhythm points). Then, the processor 20 may integrate the composite video clip V1 and the predetermined music segment M to output a recommended video V2. In the playing of the recommended video V2, the playing of the edited video clip A' and the playing of the background music M between the rhythm points S1 and S2 start at the same time and end at the same time, the playing of the edited video clip B' and the playing of the background music M between the rhythm points S3 and S4 start at the same time and end at the same time, and the playing of the edited video clip C' and the playing of the background music M between the rhythm points S2 and S3 start at the same time and end at the same time. As such, the composite video clip obtained by splicing the more than one edited video clips can match with the background music, which improve the impact and expressiveness of the recommended video V2.

Referring to FIG. 2 and FIG. 18, the embodiments of the disclosure provide a non-transitory computer-readable medium 300 storing one or more computer-executable instructions 302. The computer-executable instructions 302, when executed by one or more processors 20, cause the or more processors 20 to perform the video editing method according to any one of the above embodiments.

In some embodiments, the video editing method includes the operations as follows. At least one video clips are marked in an original video. One of the at least one video clips, which has a duration greater than or equal to a time interval between two adjacent rhythm points in a predetermined music segment and is with a smallest one of all time differences corresponding to the at least one video clips, is determined as the to-be-edited video clip, based on a time interval between the two adjacent rhythm point. Each of the all time differences is a difference between the duration of each of the at least one video clips and the time interval. A to-be-edited video clip is edited to obtain an edited video clip, where a starting time and an ending time of the edited video clip correspond to the two rhythm points, respectively.

For example, referring to FIG. 1, when the computer-executable instructions 302 are executed by the one or more processors 20, cause the or more processors 20 to perform operations of blocks 011, 012 and 013.

At block 011, one or more video clips are marked in an original video.

At block 012, a to-be-edited video clip is determined from the one or more video clips, based on a time interval between two adjacent rhythm points in a predetermined music segment, where a duration of the to-be-edited video clip is greater than or equal to the time interval.

At block 013, the to-be-edited video clip is edited to obtain an edited video clip, where a starting time and an ending time of the edited video clip correspond to the two rhythm points, respectively.

For another example, referring to FIG. 5, when the computer-executable instructions 302 are executed by the one or more processors 20, cause the one or more processors 20 to perform operation of block 0121.

At block 0121, one of the one or more video clips, which has a duration greater than the time interval and is with a smallest one of all time differences corresponding to the one or more video clips, are determined as the to-be-edited video clip, where each of the all time differences is a difference between the duration of each of the one or more video clips and the time interval.

Although the embodiments of the disclosure have been shown and described above, it can be understood that the above embodiments are exemplary and should not be construed as limitations on the disclosure. Changes, alternatives, and modifications can be made to the above embodiments within the scope of the disclosure by those skilled in the art. The scope of this application is defined by the claims and their equivalents.

What is claimed is:

1. A video editing method, comprising:
   marking at least one video clip in an original video;
   determining, based on a time interval between two adjacent rhythm points in a predetermined music segment, a first video clip from the at least one video clip, wherein a duration of the first video clip is greater than the time interval; and
   editing the first video clip to obtain a second video clip, wherein a starting time and an ending time of the second video clip correspond to the two rhythm points;
   wherein the editing the first video clip to obtain a second video clip, comprises:
      identifying a starting time of silence and an ending time of silence in the first video clip;
      in response to a first duration is greater than or equal to an editing duration, editing the first video clip backwards from a starting time of the first video clip to obtain the second video clip, wherein the first duration is a silence duration corresponding to the starting time of the first video clip, and the editing duration is equal to a duration of a part of the first video clip exceeding the time interval;
      in response to a second duration is greater than or equal to the editing duration, editing the first video clip forward from an ending time of the first video clip to obtain the second video clip, wherein the second duration is a silence duration corresponding to the ending time of the first video clip.

2. The video editing method as claimed in claim 1, wherein the determining, based on a time interval between two adjacent rhythm points in a predetermined music segment, a first video clip from the at least one video clip, comprises:
   determining one of the at least one video clip, which has a duration greater than the time interval and is with a smallest one of all time differences corresponding to the at least one video clip, as the first video clip, wherein each of the all time differences is a difference between the duration of each of the at least one video clip and the time interval.

3. The video editing method as claimed in claim 1, wherein the editing the first video clip backwards from a starting time of the first video clip to obtain the second video clip, comprises:
   editing the first video clip backwards from the starting time of the first video clip, to clip off a part of the first video clip corresponding to the editing duration; and
   taking, as the second video clip, a remaining part of the first video clip except for the clipped off part; and
   wherein the editing the first video clip forward from an ending time of the first video clip to obtain the second video clip, comprises:
   editing the first video clip forward from the ending time of the first video clip, to clip off a part of the first video clip corresponding to the editing duration; and
   taking, as the second video clip, a remaining part of the first video clip except for the clipped off part.

4. The video editing method as claimed in claim 1, wherein the editing the first video clip to obtain a second video clip, comprises:
   in response to the first duration and the second duration are both less than the editing duration, and the sum of the first duration and the second duration is greater than or equal to the editing duration, editing the first video clip from both the starting time of the first video clip and the ending time of the first video clip to obtain the second video clip.

5. The video editing method as claimed in claim 4, wherein the editing the first video clip from both the starting time of the first video clip and the ending time of the first video clip to obtain the second video clip, comprises:
- editing the first video clip backwards from the starting time of the first video clip, to clip off a first part of the first video clip corresponding to a first editing duration, wherein the first editing duration is less than or equal to the first duration;
- editing the first video clip forward from the ending time of the first video clip, to clip off a second part of the first video clip corresponding to a second editing duration, wherein the second editing duration is less than or equal to the second duration, and a sum of the first editing duration and the second editing duration is equal to the editing duration; and
- taking, as the second video clip, a remaining part of the first video clip except for the first part and the second part.

6. The video editing method as claimed in claim 4, wherein the editing the first video clip to obtain a second video clip, comprises:
- in response to the sum of the first duration and the second duration is less than the editing duration, obtaining a silence duration corresponding to the starting time of silence; and
- in response to the silence duration corresponding to the starting time of silence is greater than the editing duration, editing the first video clip from the starting time of silence to obtain the second video clip.

7. The video editing method as claimed in claim 6, wherein the editing the first video clip from the starting time of silence to obtain the second video clip, comprises:
- editing the first video clip from the starting time of silence to clip off a part of the first video clip video corresponding to the editing duration, and obtaining two remaining parts of the first video clip video except for the clipped off part; and
- splicing the two remaining parts of the first video clip video together to obtain the second video clip.

8. The video editing method as claimed in claim 1, further comprising:
- identifying repeated parts of a plurality of video clips taken from the same original video; and
- clipping off the repeated part(s) of any N−1 number of video clips from N number of the plurality of video clips having the identified repeated parts, where N is a positive integer greater than 1.

9. The video editing method as claimed in claim 8, wherein the identifying repeated parts of a plurality of video clips taken from the same original video, comprises:
- for each of the at least one video clip, obtaining a video path and time information of the video clip, wherein the time information comprises a play starting time and a paly ending time of the video clip in the original video;
- determining, based on the video path, the plurality of video clips taken from the same original video; and
- in response to determining an overlap between time periods from the respective play starting times to the respective play ending times of two video clips in the plurality of video clips, identifying the repeated parts of the two video clips.

10. The video editing method as claimed in claim 1, further comprising:
- splicing, based on the starting time and the ending time of each of more than one the second video clip, the more than one second video clips to obtain a composite video clip; and
- integrating the composite video clip with the predetermined music segment to output a recommended video.

11. The video editing method as claimed in claim 1, wherein the marking at least one video clip in an original video, comprises:
- determining a type of the original video based on content of the original video; and
- determining, based on the type of the original video, at least one highlight in the original video as the at least one video clips.

12. A terminal, comprising a processor, wherein the processor is configured to implement operations comprising:
- marking at least one video clip in an original video;
- for every two adjacent rhythm points in a predetermined music segment, determining, based on a time interval between the two adjacent rhythm points, a first video clip from the at least one video clip, wherein a duration of the first video clip is greater than the time interval; and
- editing the first video clip to obtain a second video clip, wherein a starting time and an ending time of the second video clip correspond to the two rhythm points;

wherein the processor is specifically configured to implement operations comprising:
- identifying a starting time of silence and an ending time of silence in the first video clip;
- in response to a first duration is greater than an editing duration, editing the first video clip backwards from a starting time of the first video clip to obtain the second video clip, wherein the first duration is a silence duration corresponding to the starting time of the first video clip, and the editing duration is equal to a duration of a part of the first video clip exceeding the time interval; and
- in response to a second duration is greater than the editing duration, editing the first video clip forward from an ending time of the first video clip to obtain the second video clip, wherein the second duration is a silence duration corresponding to the ending time of the first video clip.

13. The terminal as claimed in claim 12, wherein the processor is specifically configured to implement operations comprising:
- determining one of the at least one video clip, which has a duration greater than the time interval and is with a smallest one of all time differences corresponding to the at least one video clip, as the first video clip, wherein each of the all time differences is a difference between the duration of each of the at least one video clip and the time interval.

14. The terminal as claimed in claim 12, wherein the processor is specifically configured to implement operations comprising:
- in response to the first duration and the second duration are both less than the editing duration, determining whether a sum of the first duration and the second duration is greater than the editing duration; and
- in response to the sum of the first duration and the second duration is greater than the editing duration, editing the first video clip from both the starting time of the first video clip and the ending time of the first video clip to obtain the second video clip.

15. The terminal as claimed in claim 14, wherein the processor is specifically configured to implement operations comprising:

in response to the sum of the first duration and the second duration is less than the editing duration, obtaining a silence duration corresponding to the starting time of silence; and in response to the silence duration corresponding to the starting time of silence is greater than the editing duration, editing the first video clip from the starting time of silence to obtain the second video clip.

16. The terminal as claimed in claim 12, wherein the processor is further configured to implement operations comprising:

identifying repeated parts of a plurality of video clips taken from the same original video; and clipping off the repeated part(s) of any N−1 number of video clips from N number of the plurality of video clips having the identified repeated parts, where N is a positive integer greater than 1.

17. The terminal as claimed in claim 12, wherein the processor is further configured to implement operations comprising:

splicing, based on the starting time and the ending time of each of more than one the second video clip, the more than one second video clip to obtain a composite video clip; and integrating the composite video clip with the predetermined music segment to output a recommended video.

18. A non-transitory computer-readable medium stored with computer-executable instructions, wherein the computer-executable instructions are configured to, when executed by at least one processor, cause the at least one processor to implement a video editing method comprising:

marking at least one video clip in an original video;

determining one of the at least one video clip, which has a duration greater than a time interval between two adjacent rhythm point in a predetermined music segment and is with a smallest one of all time difference(s) corresponding to the at least one video clip, as a first video clip, wherein each of the all time difference(s) is a difference between the duration of each of the at least one video clip and the time interval;

editing the first video clip to obtain a second video clip, wherein a starting time and an ending time of the second video clip correspond to the two rhythm points;

wherein the editing the first video clip to obtain a second video clip, comprises:

identifying a starting time of silence and an ending time of silence in the first video clip;

in response to a first duration is greater than an editing duration, editing the first video clip backwards from a starting time of the first video clip to obtain the second video clip, wherein the first duration is a silence duration corresponding to the starting time of the first video clip, and the editing duration is equal to the time difference between the first video clip and the time interval; and in response to a second duration is greater than the editing duration, editing the first video clip forward from an ending time of the first video clip to obtain the second video clip, wherein the second duration is a silence duration corresponding to the ending time of the first video clip.

19. The non-transitory computer-readable medium as claimed in claim 18, wherein the editing the first video clip to obtain a second video clip, further comprises:

in response to the first duration and the second duration are both less than the editing duration, and the sum of the first duration and the second duration is greater than or equal to the editing duration, editing the first video clip from both the starting time of the first video clip and the ending time of the first video clip to obtain the second video clip;

in response to the sum of the first duration and the second duration is less than the editing duration, obtaining a silence duration corresponding to the starting time of silence; and in response to the silence duration corresponding to the starting time of silence is greater than the editing duration, editing the first video clip from the starting time of silence to obtain the second video clip.

20. The non-transitory computer-readable medium as claimed in claim 18, wherein the video editing method further comprises:

identifying repeated parts of a plurality of video clips taken from the same original video; and clipping off the repeated part(s) of any N−1 number of video clips from N number of the plurality of video clips having the identified repeated parts, where N is a positive integer greater than 1.

* * * * *